(12) United States Patent
Dini et al.

(10) Patent No.: US 7,974,216 B2
(45) Date of Patent: Jul. 5, 2011

(54) APPROACH FOR DETERMINING THE REAL TIME AVAILABILITY OF A GROUP OF NETWORK ELEMENTS

(75) Inventors: Cosmin Nicu Dini, San Jose, CA (US); Petre Dini, San Jose, CA (US); Manuela I. Popescu, San Jose, CA (US); Mark Ammar Rayes, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1211 days.

(21) Appl. No.: 10/995,453

(22) Filed: Nov. 22, 2004

(65) Prior Publication Data
US 2006/0165052 A1 Jul. 27, 2006

(51) Int. Cl.
*H04L 12/28* (2006.01)
*G06F 15/173* (2006.01)

(52) U.S. Cl. .......................... 370/254; 370/351; 709/223

(58) Field of Classification Search .................. 370/254, 370/255, 256, 338, 351, 352, 400, 466; 709/223, 709/224
See application file for complete search history.

(56) References Cited

U.S. PATENT DOCUMENTS

| 4,070,647 | A | 1/1978 | Robson |
| 5,341,477 | A | 8/1994 | Pitkin et al. |
| 5,481,548 | A | 1/1996 | Wallace |
| 6,003,090 | A | 12/1999 | Puranik et al. |
| 6,073,089 | A | 6/2000 | Baker et al. |
| 6,317,775 | B1 | 11/2001 | Coile et al. |
| 6,496,948 | B1 * | 12/2002 | Smorodinsky .................. 714/37 |
| 6,601,084 | B1 | 7/2003 | Bhaskaran et al. |
| 6,629,148 | B1 | 9/2003 | Ahmed et al. |
| 6,658,473 | B1 | 12/2003 | Block et al. |
| 6,735,548 | B1 | 5/2004 | Huang et al. |
| 6,754,854 | B2 | 6/2004 | Kurrasch |
| 6,785,889 | B1 | 8/2004 | Williams |

(Continued)

FOREIGN PATENT DOCUMENTS

JP 2000-311130 11/2000

(Continued)

OTHER PUBLICATIONS

Dr. Sidnie Feit, SNMP, A Guide to Network Management, McGraw-Hill, Inc., 1995, 702 pages.

(Continued)

*Primary Examiner* — Hassan Phillips
*Assistant Examiner* — Saba Tsegaye
(74) *Attorney, Agent, or Firm* — Hickman Palermo Truong & Becker LLP

(57) ABSTRACT

The real time availability of a group of network elements is determined based upon both a real time availability value for each of the network elements and cooperation relationships between the network elements. The cooperation relationships reflect both the topological relationships between the network elements, i.e., how the network elements are connected, and the extent to which network elements interact with each other effectively. For relatively small groups of network elements, where the cooperation relationships are not overly complex, the real time availability is determined directly from the real time availability value for each of the network elements and cooperation relationships between the network elements. Decomposition and recombination are used to determine the real time availability of large groups of network elements based on specific formulas for basic network element topology models.

32 Claims, 5 Drawing Sheets

U.S. PATENT DOCUMENTS

| | | | |
|---|---|---|---|
| 6,975,633 B1* | 12/2005 | T'Joens | 370/401 |
| 6,996,514 B2 | 2/2006 | Gruber | |
| 7,024,580 B2 | 4/2006 | Guimbellot et al. | |
| 7,035,919 B1 | 4/2006 | Lee et al. | |
| 7,058,717 B2 | 6/2006 | Chao et al. | |
| 7,145,881 B1* | 12/2006 | Dawes et al. | 370/253 |
| 7,342,900 B2 | 3/2008 | Xiong et al. | |
| 2002/0143960 A1* | 10/2002 | Goren et al. | 709/229 |
| 2002/0156893 A1* | 10/2002 | Pouyoul et al. | 709/225 |
| 2002/0184361 A1* | 12/2002 | Eden | 709/224 |
| 2002/0191548 A1* | 12/2002 | Ylonen et al. | 370/254 |
| 2002/0194251 A1 | 12/2002 | Richter et al. | |
| 2003/0005023 A1 | 1/2003 | Gilbert et al. | |
| 2003/0112948 A1 | 6/2003 | Brown et al. | |
| 2003/0158940 A1 | 8/2003 | Leigh | |
| 2003/0187967 A1* | 10/2003 | Walsh et al. | 709/223 |
| 2004/0008724 A1* | 1/2004 | Devine et al. | 370/466 |
| 2004/0019680 A1 | 1/2004 | Chao et al. | |
| 2004/0064583 A1 | 4/2004 | Dani et al. | |
| 2004/0215761 A1* | 10/2004 | Fujii et al. | 709/223 |
| 2004/0221191 A1 | 11/2004 | Porras et al. | |
| 2004/0248578 A1* | 12/2004 | Korpela et al. | 455/446 |
| 2005/0015504 A1 | 1/2005 | Dorne et al. | |
| 2005/0027862 A1 | 2/2005 | Nguyen et al. | |
| 2005/0055694 A1 | 3/2005 | Lee | |
| 2005/0152308 A1 | 7/2005 | Seol et al. | |
| 2005/0207380 A1* | 9/2005 | Blasco Claret et al. | 370/338 |
| 2005/0278268 A1* | 12/2005 | Crouch | 706/14 |
| 2006/0050665 A1* | 3/2006 | Bruckman | 370/329 |
| 2006/0075275 A1 | 4/2006 | Dini et al. | |
| 2006/0106938 A1 | 5/2006 | Dini et al. | |

FOREIGN PATENT DOCUMENTS

| | | |
|---|---|---|
| JP | 2002-269060 | 9/2002 |
| WO | 2007078643 A3 | 4/2008 |

OTHER PUBLICATIONS

Harold Ascher, et al., "Repairable Systems Reliability, Modeling, Interference, Misconceptions and Their Causes," Lecture Notes in Statistics, vol. 7, 1984, 239 pages.

Alain Pages, et al., "System Reliability Evaluation & Prediction in Engineering," 1986, 367 pages.

Johnson, Barry W., "Design and Analysis of Fault Tolerant Digital Systems", Addison-Wesley Publishing Co., 1989, 7 pages.

Alan Bivens, Sever/Application State Protocol version 1 (SASPv1), IMB TJ Watson Research Center Internet Draft, Jun. 2004, 33 pages.

Growing Your E-Business with IBM Server Load Balancing and Caching embedded solutions, http://www.networking.ibm.com/nhd/webnav.nsf/pages/white:serverload.html 8 pages.

Dongarra, "Three tools to help with cluster and grid computing: SANS-Effort, PAPI, and NetSolve", Proceedings CCGRID 2002, 2nd IEEE/ACM International Symposium on Cluster Computing and the Grid, 2002, 11 pages.

Growing Your E-Business with IBM Server Load Balancing and Caching embedded solutions, 1999, http://www.networking.ibm.com/nhd/webnav.nsf/pages/white:serverload.html 8 pages.

* cited by examiner

APPROACH FOR DETERMINING THE REAL TIME AVAILABILITY OF A GROUP OF NETWORK ELEMENTS

CROSS-REFERENCE TO RELATED APPLICATIONS

This application is related to U.S. patent application Ser. No. 10/714,192, filed on Nov. 14, 2003, now U.S. Pat. No. 7,620,714, entitled METHOD AND APPARATUS FOR MEASURING THE AVAILABILITY OF A NETWORK ELEMENT OR SERVICE. This application is also related to U.S. patent application Ser. No. 10/956,286, filed on Oct. 1, 2004, now U.S. Pat. No. 7,631,225, entitled APPROACH FOR CHARACTERIZING THE DYNAMIC AVAILABILITY BEHAVIOR OF NETWORK ELEMENTS. The contents of both applications are hereby incorporated herein by reference in their entirety for all purposes.

FIELD OF THE INVENTION

The present invention generally relates to the analysis of network elements and services. The invention relates more specifically to an approach for determining the real time availability of subnetworks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks typically are comprised of multiple network elements, such as routers, that communicate data to each other. Working together or individually, network elements may provide various services. For example, several routers working together may provide a voice-over-IP service.

The quality of network elements or services may be measured according to various metrics. One metric used to measure the quality of network elements and services is the availability metric. At least in theory, a network element's availability with respect to a given time period should reflect the fraction of that time period that the network element was at least partially operational. To simplify the discussion herein, availability is discussed in the context of network elements. However, the following references to the availability of network elements apply equivalently any other kind of computing element, and to services.

The availability metric theoretically could be used for many different purposes. For example, if obtained accurately, the availability metric might be used to perform availability-based routing. Given multiple network routes between a specified source and a specified destination, availability-based routing would seek to determine and use the route that contains network elements having the highest aggregate availability. As another example, the availability metric might be used for load balancing. Given the availability of multiple network elements to participate in a task, load balancing would seek to distribute the task to network elements having the highest availability.

Conventional approaches for determining network element availability have significant drawbacks. Some approaches approximate the availability of types or classes of network elements generally and then apply those approximations to specific network elements. In real-time operation however, the actual availability of a specific network element can vary greatly from the availability approximated for the corresponding type or class of network element. Also, conventional approaches assume network elements are operating in isolation and do not take into consideration the status of interactions with other network elements or how those interactions may change over time. Thus, conventional approaches are not well suited for determining the network availability of groups of network elements or subnetworks. Given the limitations in conventional approaches, there is a need for an approach for estimating the real time availability of subnetworks that does not suffer from limitations of conventional approaches.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described hereinafter in the following sections:
I. OVERVIEW
II. COOPERATION RELATIONSHIPS AND COMPOSITION CLASSES
III. AVAILABILITY COMPUTATIONAL MODELS FOR COMPOSITION CLASSES
   A. Two or More Network Elements in Series
   B. One Provider and Two or More Customers for the Same Service
   C. One Provider of Two or More Services to Two or More Customers D. One Customer Requesting Multiple Services From Multiple Providers
E. One Customer Requesting a Service That Can Be Provided by Two or More Resources
F. Three Party Cooperation

IV. OPERATIONAL EXAMPLE
V. IMPLEMENTATION MECHANISMS

I. Overview

An approach is provided for determining a (near)-real time availability of a group of network elements based upon both a real time availability value for each of the network elements and cooperation relationships between the network elements. The cooperation relationships reflect both the topological relationships between the network elements, i.e., how the network elements are connected, and the extent to which network elements interact with each other. For relatively small groups of network elements, where the cooperation relationships are not overly complex, the real time availability is determined directly from the real time availability value for each of the network elements and cooperation relationships between the network elements. For larger groups of network elements however, the complexity of cooperation relationships may make determining the real time availability of the entire group of network elements too difficult. Therefore, iterative reduction is used to determine the real time availability of large groups of network elements.

Figure 1:
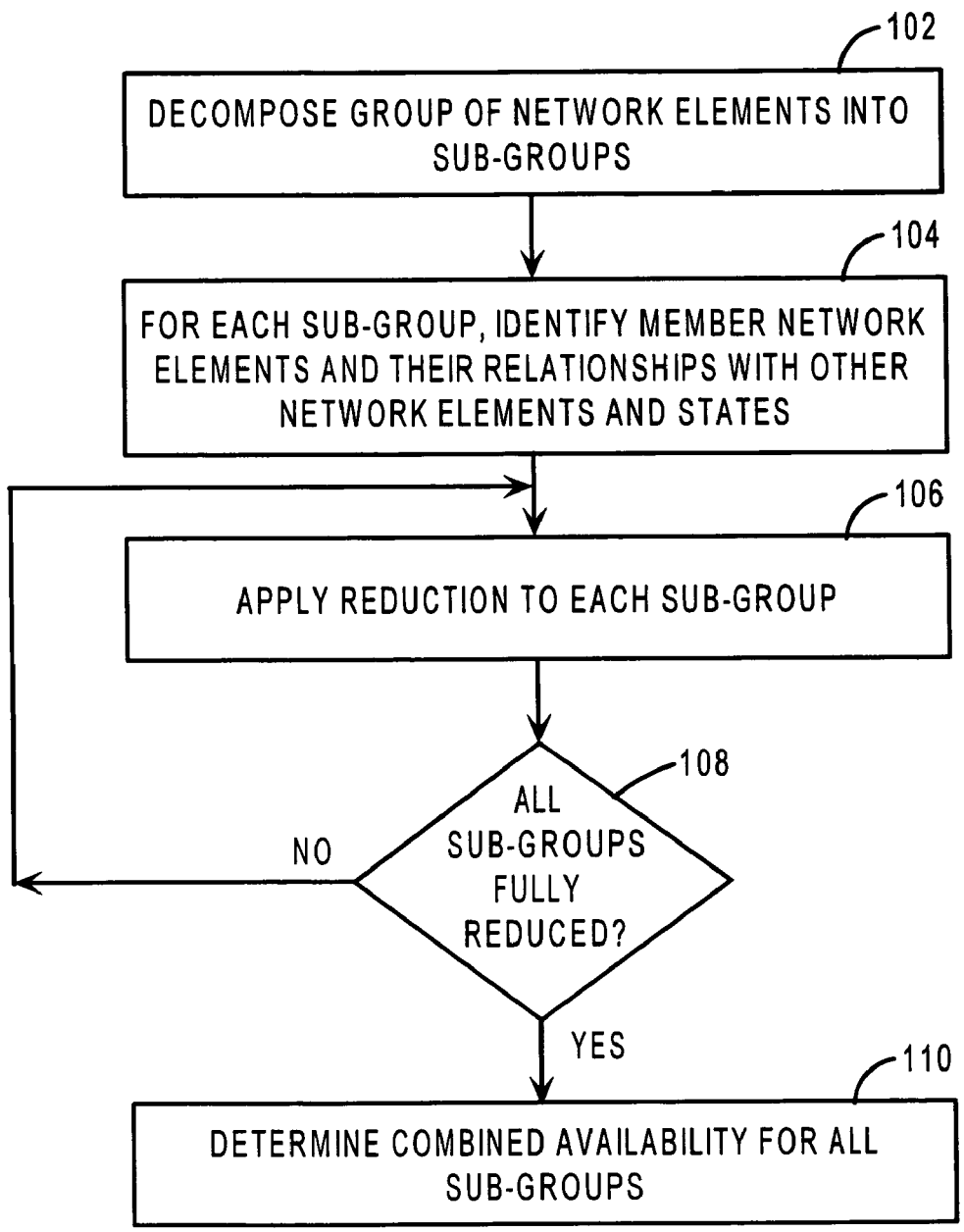
FIG. 1 is a flow diagram that depicts an overview of an approach for determining the real time availability of a group of network elements, according to an embodiment of the invention.

FIG. 1 is a flow diagram 100 that depicts an overview of an approach for determining the real time availability of a group of network elements using reduction, according to an embodiment of the invention. A more detailed operational example is described hereinafter. In step 102, a group of network elements is decomposed into smaller sub-groups. The determination of the sub-groups may be made based upon a variety of factors, such as functional factors, administrative factors, geographical factors, etc. For example, in a domain hierarchy managed system, a sub-group may be a domain, or part of a domain.

In step 104, for each sub-group, the member network elements are identified, as well as the relationships between the member network elements and other network elements and the states of those relationships. For example, a determination is made whether, for each network element, its relationship with other network elements is external or internal, and whether the state of each relationship is active or inactive. An availability formula is proposed for various types of pattern sub-groups.

In step 106, each sub-group is reduced to one virtual element [a unique availability value or interval]. In this step, the availability of a set of two or more network elements in each sub-group is determined. The determined availabilities are then used in subsequent reduction steps to further reduce each sub-group. For example, the availability is determined for a particular set of two or more network elements. This may include the use of a basic availability model (aka, sub-groups), as described in more detail hereinafter. For computational purposes, the particular set of network elements is replaced by a virtual network element that has an availability that represents the aggregate availability of the particular set of network elements.

In step 108, a determination is made whether all of the sub-groups have been fully reduced. A sub-group is considered to be fully reduced when the sub-group has been reduced to a single virtual network element having a corresponding single availability value. If in step 108, the sub-groups have not all been fully reduced, then steps 106 and 108 are repeated until all of the sub-groups have been fully reduced. Steps 106 and 108 may be repeated any number of times and the number of repetitions will generally depend upon the number of network elements in each sub-group and the complexity of each sub-group. Once a determination has been made that all the sub-groups have been fully reduced, then in step 110, a combined availability is determined for all of the sub-groups.

Each of the foregoing steps is described in more detail hereinafter. The approach is applicable to any type of network elements or services and any configuration or topology. The approach also considers different types of interfaces of network elements and the interactive state of those interfaces, since network elements may have different availability for different interfaces. As described in more detail hereinafter, the approach may also include the use of focal points, focal point hierarchies and views. Focal points are computing elements within a sub-group that is in charge of calculating the availability for a given sub-group. Upon reduction, many focal points may form an identified basic model, and one of them is defined as the focal point to compute their real time availability.

II. Cooperation Relationships and Composition Classes

According to one embodiment of the invention, network elements are classified into three composition classes based upon their cooperation relationships with other network elements. The composition classes include (1) non-related network elements; (2) related, independent and non-cooperating network elements; and (3) related, independent and cooperating elements. Non-related network elements are network elements that do not relate with or interact with other network elements in the subject group of network elements. One example of non-related network elements is two separate nodes in a telecommunications network that serve different customers and do not have any interaction. An example of a related, independent and non-cooperating network element is when a network element that has just been added to a network, so that it is now part of the topology, but has not yet interacted with any other network elements.

III. Availability Computational Models for Composition Classes

The availability of a group of network elements in the first composition class of non-related network elements is determined by the average availability of the individual network elements. Thus, the availability of the group of N number of network elements in the first composition class is defined by: $A_{1,2,\ldots N} = (A_1 + A_2 + \ldots A_N)/N$.

The availability of a group of network elements in the second composition class of related, independent, and non-cooperating network elements is determined by the range of availability values for the group of network elements. Thus, the availability of the group of N number of network elements in the second composition class is defined by: $A_{1,2,\ldots N} = [\min(A_1, A_2, \ldots A_N), \max(A_1, A_2, \ldots A_N)]$.

The availability of a group of network elements in the third composition class of related, independent and cooperating elements is determined based upon a set of basic availability models that are selectively applied based upon the cooperation between network elements. The basic availability models apply to the following situations: a) two or more network elements in series; b) one provider and two or more customers for the same service; c) one provider and two or more customers for different services; d) one customer requesting service from several providers; e) one customer requesting a service that can be provided by at least two resources; and f) three party cooperation.

A. Two or More Network Elements in Series

Figure 2:
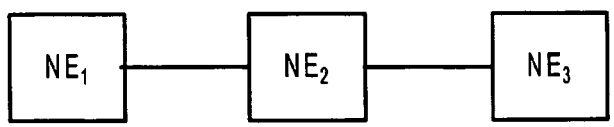
FIG. 2 is a block diagram that depicts three network elements, identified as $NE_1$, $NE_2$ and $NE_3$, arranged in series.

FIG. 2 is a block diagram 200 that depicts three network elements, identified as $NE_1$, $NE_2$ and $NE_3$, arranged in series. Network elements $NE_1$, $NE_2$ and $NE_3$ may be any type of network elements. As one example, network element $NE_2$ is a local area network (LAN) and network elements $NE_1$ and $NE_3$ are network devices that communicate via the LAN. According to one embodiment of the invention, the availability of a group of network elements arranged in series is the product of their individual availabilities. In the present example, the overall availability of the group of network elements $NE_1$, $NE_2$ and $NE_3$ is defined by: $A_{NE1, NE2, NE3} = A_{NE1} \times A_{NE2} \times A_{NE3}$.

B. One Provider and Two or More Customers for the Same Service

Figure 3:
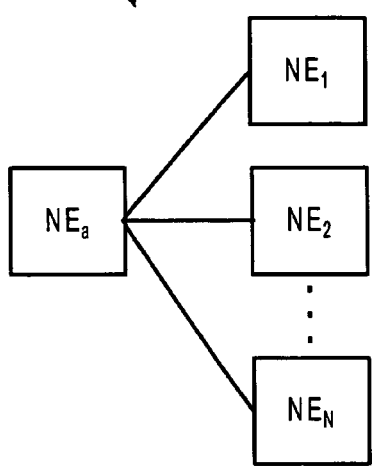
FIG. 3 is a block diagram that depicts a group of network elements that includes a network element providing a service to N number of other network elements.

FIG. 3 is a block diagram 300 that depicts a group of network elements that includes a network element $NE_a$ providing a service to N number of other network elements, identified as $NE_1$, $NE_2$ through $NE_N$. As one example, network element $NE_a$ is a server providing a service and network elements $NE_1$, $NE_2$ through $NE_N$ are clients using the service provided by network element $NE_a$. Another example is a LAN point-to-multipoint connection.

The availability of a network element $NE_a$ with respect to a network element $NE_1$ is defined as the product of the availability of network element $NE_a$ and the availability of network element $NE_i$. Thus, $A_{a,i} = A_a \times A_i$, for $1 <= i <= N$. This assumes the relation $(A_a, A_i)$ is active. According to one embodiment of the invention, the availability of network element $NE_a$ with respect to a network elements $NE_1$, $NE_2$ through $NE_N$ is defined by the minimum and maximum availability values for all the active relationships between network element $NE_a$ and network elements $NE_1$, $NE_2$ through $NE_N$. Thus, $A_{a,1,2,...N} = [\min(A_a \times A_i), \max(A_a \times A_i)]$, for $1 <= i <= N$, which may be used, for example, for management purposes. Inactive relationships are simply excluded from the determination.

In the prior example, it is noted that as the number of network elements using the service provided by network element $NE_a$ increases, there may be a gradual decrease in the quality of service (QoS), even thought the availability of network element $NE_a$ is stable. According to one embodiment of the invention, the availability of network element $NE_a$ is defined by $A_{a,1,2,...N} = [\min((A_a)^n \times A_i), \max((A_a)^n \times A_i)]$, for $1 <= i <= N$ and where $n = n_{max} - n_{min}$. It is observed that if the number of network elements using the service provided by network element $NE_a$ increases, then the availability decreases with the power of the availability of the provider network element $NE_a$. It is also observed that if an $n_{max}$ is not specified, that the term $(A_a)^n$ rapidly decreases and tends towards zero.

C. One Provider of Two or More Services to Two or More Customers

In some situations, a network element may provide different services to two or more other network elements. If the availability of the network element does not differentiate between the different services for purposes of availability, then the availability of a group of network elements where one network element in the group provides multiple services to two or more other network elements in the group is determined in the same manner as described above for a network provider providing a service to two or more customers. This situation may arise, for example, where enabled and disabled states of the network device are not tracked separately for each service. Furthermore, if the availability of each service is tracked separately, but a particular service is being used by only a single network element, then the availability of the network element providing the service and the network element using the service is the product of their individual availabilities. For a group of network elements, where one network element is providing multiple services to two or more other network elements, where each service is used by a single network element, the availability of the group of network elements is determined as described herein with respect to a network element offering a service to two or more other network elements in the group, or $A_{a,1,2,...N} = [\min(A_a \times A_i), \max(A_a \times A_i)]$, for $1 <= i <= N$.

Figure 4:
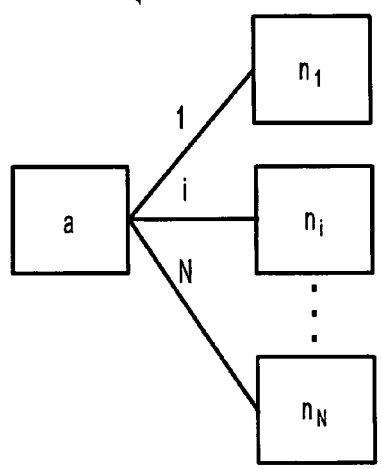
FIG. 4 is a block diagram that depicts a group of network elements where a network element "a" provides N number of services to network elements $n_1, n_2, \ldots n_N$.

Consider the more complex situation, where in a group of network elements, a network element provides multiple services to two or more other network elements in the group, and where each service may be used by more than one of the other network elements. In this situation, the availability of the network element providing the service with respect to one of the other network elements, with respect to a particular service, is the product of the availabilities of the network element providing the service and the network element using the service, where the availability of each network element is with respect to the particular service. Thus, at the most basic level, the availability is considered with respect to the provider of the service and a network element using the service, with respect to the particular service. FIG. 4 is a block diagram 400 that depicts a group of network elements where a network element "a" provides N number of services to network elements $n_1, n_2, \ldots n_N$. In this situation, the availability of the group of network elements is defined by the range of availabilities for the pairs of network elements $a/n_i$ across the services. Thus, $A_{a,1,2,...ni} = [\min(A_{a,s})_i, \max(A_{a,s})_i]$, for $1 <= s <= n_i$, $1 <= i <= N$.

D. One Customer Requesting Multiple Services From Multiple Providers

Figure 5:
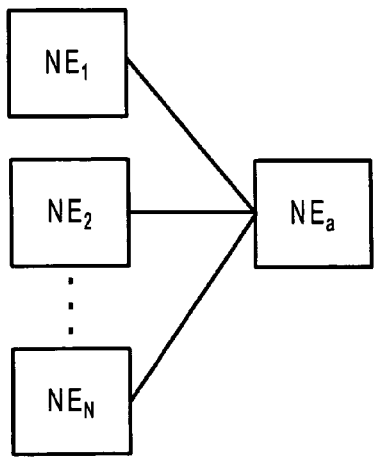
FIG. 5 is a block diagram that depicts a group of network elements that includes network elements $NE_1$, $NE_2$ through $NE_N$ simultaneously providing services to a network element $NE_a$.

FIG. 5 is a block diagram 500 that depicts a group of network elements that includes network elements $NE_1$, $NE_2$ through $NE_N$ simultaneously providing services to a network element $NE_a$. This situation represents an "AND" situation in that network element $NE_a$ requires the services provided by network elements $NE_1$, $NE_2$ through $NE_N$. In this situation, the availability of the group of network elements is the product of the availability of all participating network elements with active cooperation with network element $NE_a$. Thus, $A_{a, NE1, NE2, \ldots NEN} = A_a \times A_{NE1} \times A_{NE2} \times \ldots A_{NEN}$.

E. One Customer Requesting a Service that can be Provided by Two or More Resources In some situations, network elements can use services from two or more network elements. This may occur, for example, with redundant hardware systems or redundant software services, or stand-by resources or resources having interchangeable functionality. Referring again to FIG. 5, suppose that network element $NE_a$ can obtain a service from any of network elements $NE_1$, $NE_2$ through $NE_N$. This situation represents an "OR" situation in that network element $NE_a$ can use a service from any of network elements $NE_1$, $NE_2$ through $NE_N$. Thus, this situation has a relatively higher availability compared to the "AND" case where one customer requests multiple services from multiple providers, since the service may be provided by any of the providers.

Figure 6:
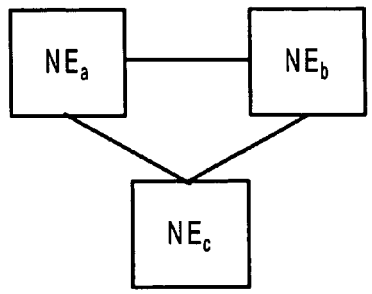
FIG. 6 is a block diagram that depicts a three network element cooperation arrangement.

The availability of network element $NE_a$ with respect to any one of network elements $NE_1$, $NE_2$ through $NE_N$ is defined as the product of the availability of network element $NE_a$ and the particular network element $NE_1$, $NE_2$ through $NE_N$. For example, the availability of network element $NE_a$ with respect to network element $NE_1$ is the product of the availability of network element $NE_a$ and the availability of element $NE_1$. In implementations with well chosen structures where availability is possible at the structural level, the availability of the group of elements is determined by: $A_{a,1,2,...N} = [\min(A_{a,i}), \max(A_{a,i})]$, for $1 <= i <= N$. In other implementations where a managing system has to choose among many possible structures (availability at the subsystem level), the availability of the group of elements is determined by: $A_{a, 1, 2, \ldots N} = \Sigma A_{a,i} - \Sigma A_{a,i} \times \Sigma A_{a,j} + \ldots + (1)^N \times \Sigma A_{a,1} \times \Sigma A_{a,2} \times \ldots \times \Sigma A_{a,N}$. Consider the example where N=3. In this example, the availability of the group of elements is: $A_{NEA-NE1} + A_{NEA-NE2} + A_{NEA-NE3} - (A_{NEA-NE1} \times A_{NEA-NE2}) - (A_{NEA-NE1} \times A_{NEA-NE3}) - (A_{NEA-NE2} \times A_{NEA-NE3}) + (A_{NEA-NE1} \times A_{NEA-NE2} \times A_{NEA-NE3})$, where $A_{NEA-NEi} = A_{NEA} \times A_{NEi}$. The formula is derived by similarity with the well-known mathematical formula for probabilistically depended events. This formula says that for three dependent events e1, e2 and e3 with individual probability p1, p2, and p3, the probability of $p(e1 \& e2 \& e3) = p1 + p2 + p3 - (p1 \times p2) - (p2 \times p3) - (p1 \times p2) + p1 \times p2 \times p3$ F. Three Party Cooperation FIG. 6 is a block diagram 600 that depicts a three party cooperation case. Network element $NE_a$ cooperates with network elements $NE_b$ and $NE_c$. Network element $NE_b$ cooperates with network elements $NE_a$ and $NE_c$. Network element $NE_c$ cooperates with network elements $NE_a$ and $NE_b$. The combined availability of network elements $NE_a$ and $NE_b$ is the product of their individual availabilities, or $A_{NEa-NEb} = A_{NEa} \times A_{NEb}$. The combined availability of network elements $NE_b$ and $NE_c$ is the product of their individual availabilities, or $A_{NEb-NEc} = A_{NEb} \times A_{NEc}$. The combined availability of network elements $NE_a$ and $NE_c$ is the product of their individual availabilities, or $A_{NEa-NEc} = A_{NEa} \times A_{NEc}$. The aggregate availability of all three cooperating network elements $NE_a$, $NE_b$ and $NE_c$ is similar to that used to reduce star-to-triangle and vice versa in capacitor networks. For example, if C12, C13 and C23 are the capacitors between the nodes "1", "2" and "3" arranged as a triangle, a null node "0" is introduced and the capacities C01, C02, C03 (arranged in star-shape) are computed, ensuring the same capacity between the original nodes regardless the configuration (star or triangle). By imposing this condition between the node peers 1-2, 1-3, and 2-3, three equations can be obtained of form 1-2: $A12 + A13 \times A23/(A13 + A23) = A02 + A01$ 1-3: (similar)

2-3: (similar)

Then the system can be solved knowing either A12, A13, A23 and obtaining A01, A02, A03, or vice versa.

IV. Operational Example

Figure 7:
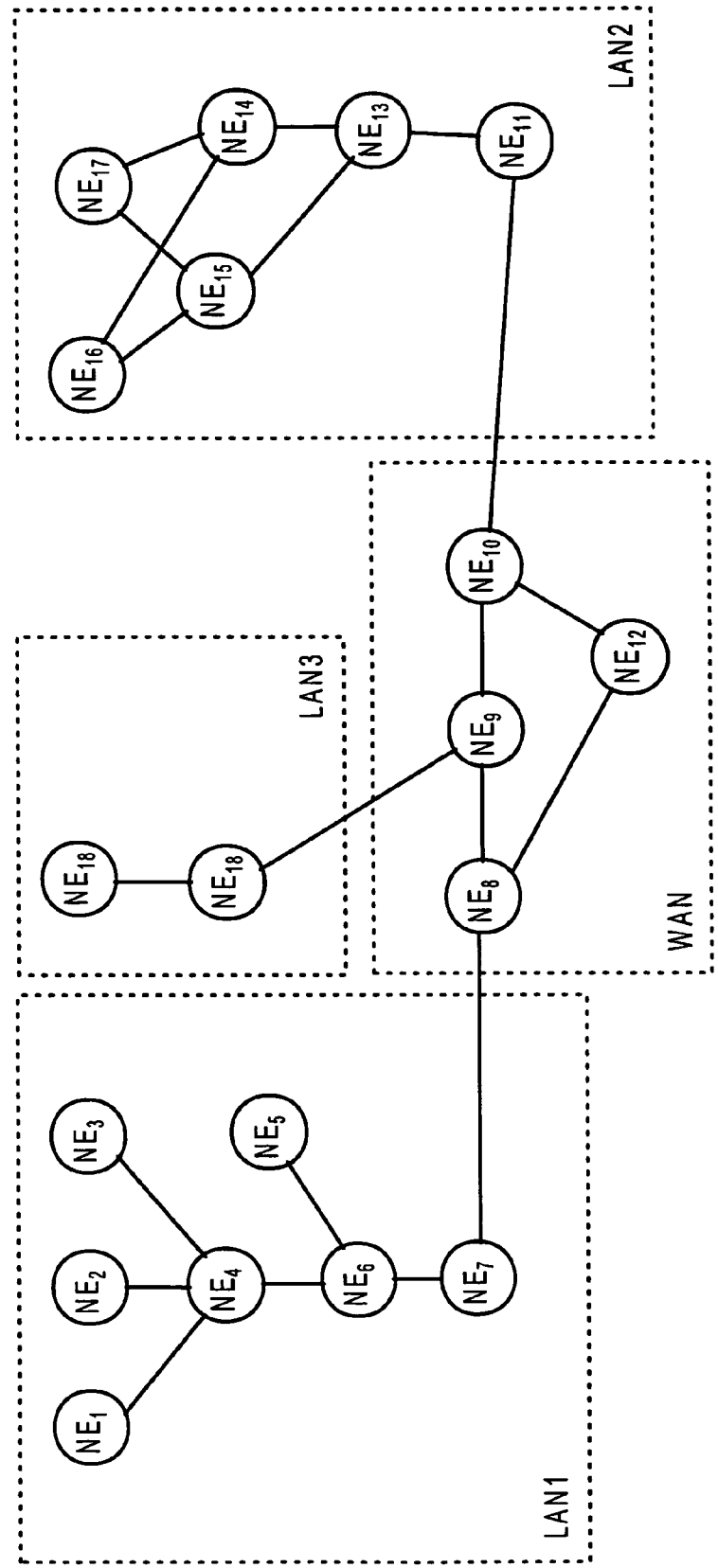
FIG. 7 is a block diagram that depicts a group of network elements.

FIG. 7 is a block diagram 700 that depicts a group of network elements individually identified as $NE_1$ through $NE_{18}$. The lines depicted in FIG. 7 that connect the various network elements denote relationships between the network elements. It is presumed that all of the indicated relationships are active and that an availability value is available for each network element.

According to the approach described herein for determining the real-time availability of a group of network elements, the group of network elements is decomposed into sub-groups. In the present example, the group of network elements is decomposed into four sub-groups, identified in FIG. 7 as LAN1, LAN2, LAN3 and WAN. The dotted lines indicate the constituent members of each sub-group.

Figure 8A:
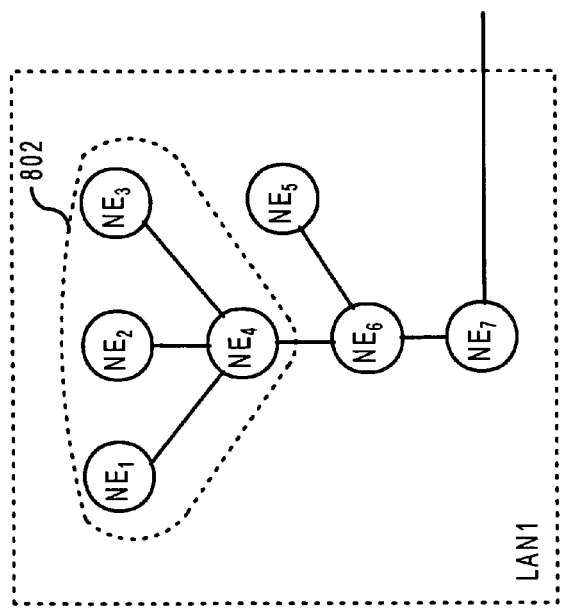
FIGS. 8A-8E are block diagrams that depict an approach for determining the availability of the network elements depicted in FIG. 7 using reduction, according to an embodiment of the invention.
Figure 8B:
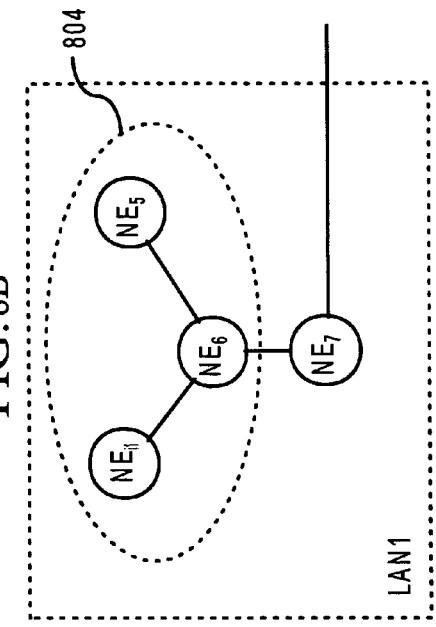

According to the approach, each sub-group is reduced to a single network element. FIGS. 8A-8D depicts the successive reduction of sub-group LAN1. In FIG. 8A, a determination is made that network elements $NE_1$-$NE_4$, identified collectively by reference numeral 802, cooperate in a manner that allows them to be reduced to a single virtual network element having a single availability value. FIG. 8B depicts a first reduction of sub-group LAN1, wherein network elements $NE_1$-$NE_4$ have been replaced by a single virtual network element identified as $NE_{i1}$. After the first reduction depicted in FIG. 8B, network element $NE_{i1}$ has an availability defined as $NE_{i1} = A_{1,2,3,4} = \min\{A_1 \times A_4, A_4 \times (A_2 + A_3)/2\}$.

Figure 8D:
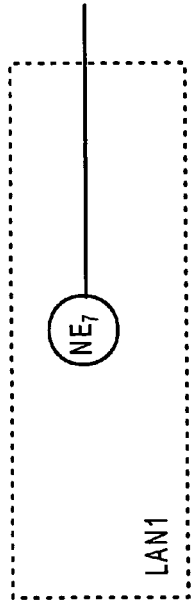
Figure 8E:
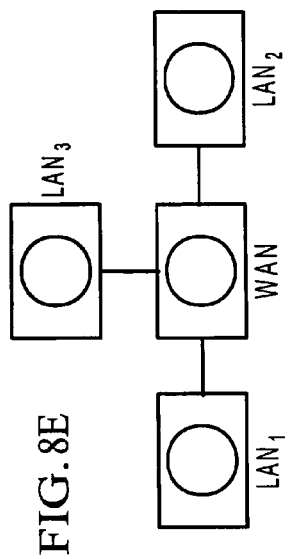
Figure 8C:
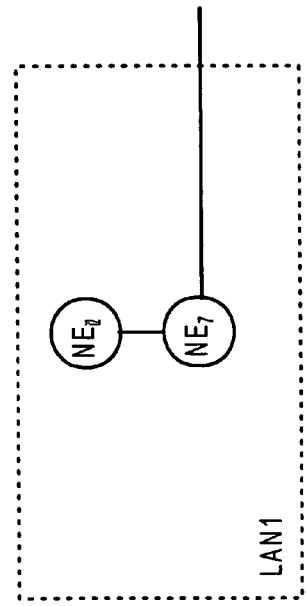

As depicted in FIG. 8B, a determination is made that network elements $NE_{i1}$, $NE_5$ and $NE_6$ have been identified collectively by reference numeral 804, cooperate in a manner that allows them to be reduced to a single virtual network element having a single availability value. FIG. 8C depicts that network elements $NE_{i1}$, $NE_5$ and $NE_6$ have been replaced by a single virtual network element identified in FIG. 8C as $NE_{i2}$. After the second reduction depicted in FIG. 8C, network element $NE_{i2}$ has an availability defined as $NE_{i2} = A_{1,2,3,4,5,6} = \min\{A_6 \times A_2, A_{1,2,3,4} \times A_6\}$.

A further determination is made that network elements $NE_{i2}$ and $NE_7$ cooperate in a manner that allows them to be reduced to a single virtual network element having a single availability value. FIG. 8D depicts that network elements $NE_{i2}$ and $NE_7$ have been replaced by a single virtual network element identified in FIG. 8D as $NE_{i3}$. After the third reduction depicted in FIG. 8D, network element $NE_{i3}$ has an availability defined as $NE_{i3} = A_{1,2,3,4,5,6,7} = A_{1,2,3,4,5,6} \times A_7$. Thus, after three reductions, sub-group LAN1 is reduced to a single virtual network element having a single availability value.

Similar reductions may be applied to the other sub-groups LAN2, LAN3 and WAN. FIG. 8E depicts the group of elements after sub-groups LAN1, LAN2, LAN3 and WAN have been fully reduced. The availability of the system of LAN1, LAN2 and WAN is defined by: $A_{SYSTEM} = \min(A_{LAN1} \times A_{WAN}, A_{LAN2} \times A_{WAN})$. Thus, the availability of the overall system may be defined by: $A = A_{SYSTEM} \times A_{LAN3}$. Alternatively, in the situation where LAN3 is administratively disconnected, wherein LAN3 is a non-related sub-group, then the overall availability may be defined by: $A = [\min(A_{SYSTEM}, A_{LAN3}), \max(A_{SYSTEM}, A_{LAN3})]$.

V. Implementation Mechanisms

The extent to which the approach described herein provides an actual real time availability depends upon a variety of factors including, for example, the number of elements being evaluated, the cooperation relationships between those elements and the amount of computational resources available to calculate the estimation. Thus, in some situations, the calculation of the estimate may be very close to instantaneous and may actually represent real time availability. In other situations, the calculation may require more time and represent a near real time availability.

The approach described herein for determining the real time availability for a group of network elements provides numerous benefits. For example, the approach allows an evaluation of availability of subnetworks and quality of service, which may help identify subnetworks with degrading performance. This allows administrative personnel to intervene to prevent larger widespread failures and to make changes necessary to provide a contracted level of service. The approach also allows an evaluation of the availability of server farms, which in turn allows for improved load balancing. The approach further allows an evaluation of the impact on system availability of adding or removing a network element or during the failure of a network element or subnetwork. This allows optimization of network configurations.

The approach described here for determining real time availability may be implemented in a wide variety of contexts and computing architectures, depending upon the requirements of a particular implementation, and the approach is not limited to any particular context or computing architecture.

Figure 9:
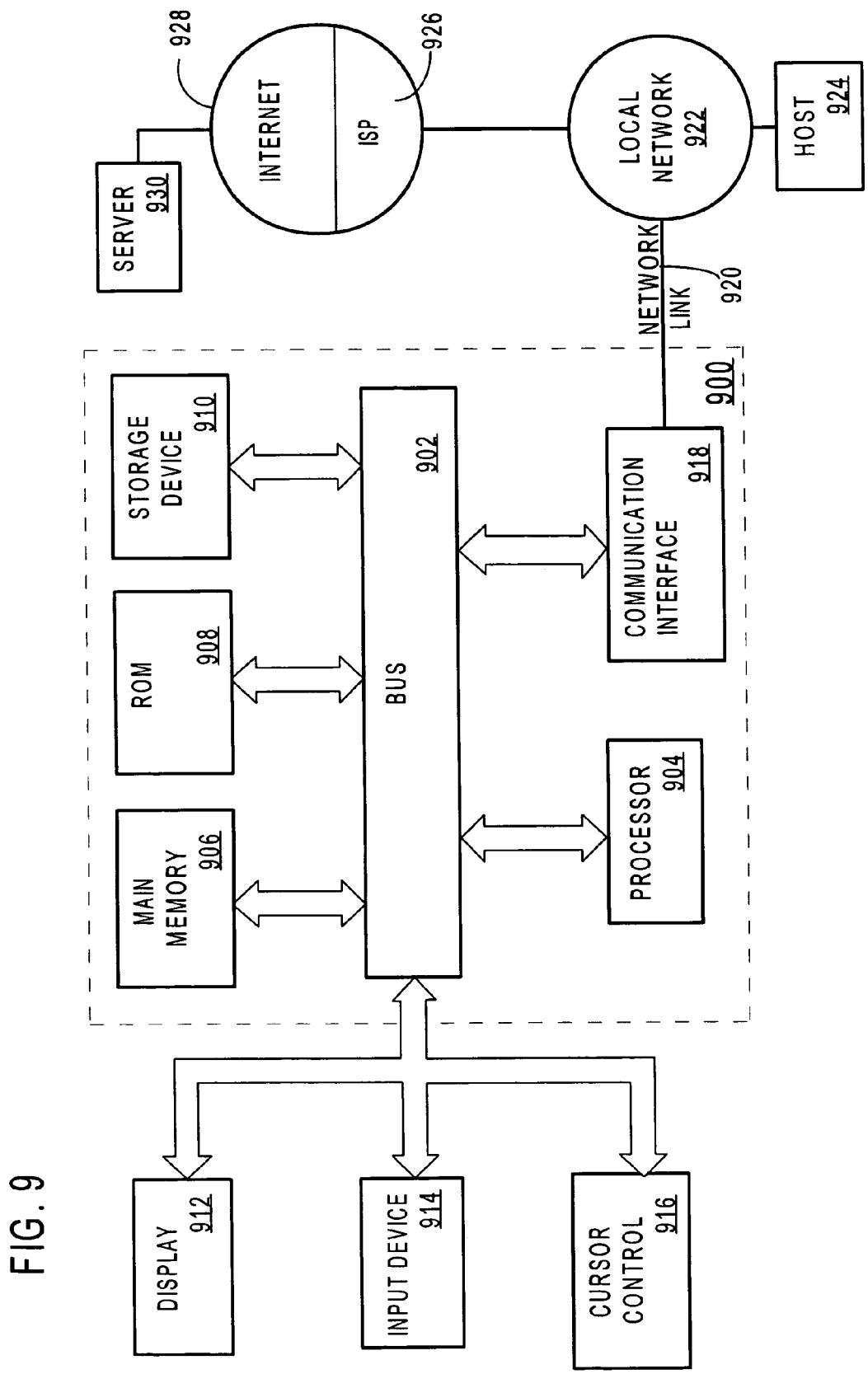
FIG. 9 is a block diagram that illustrates a computer system upon which an embodiment of the invention may be implemented.

FIG. 9 is a block diagram that illustrates an example computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 904 for execution. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of determining a real time availability of a group of two or more network elements, the method comprising:
    determining a first real time availability value based upon both an estimated real time availability value for each network element in a first set of two or more network elements in the group of two or more network elements and cooperation relationships between the network elements in the first set of two or more network elements; and
    determining a second real time availability value based upon the first real time availability value, an estimated real time availability value for each network element in a second set of two or more network elements in the group of two or more network elements, wherein the second set of two or more network elements is different than the first set of two or more network elements, cooperation relationships between the network elements in the second set of two or more network elements and cooperation relationships between one or more network elements in the first set of two or more network elements and the second set of two or more network elements.

2. The method as recited in claim 1, further comprising determining the cooperation relationships between the first set of two or more network elements based upon whether each network element from the first set of two or more network elements interacts with other network elements from the first set of two or more network elements.

3. The method as recited in claim 1, further comprising determining the cooperation relationships between the first set of two or more network elements based upon physical connections between the first set of two or more network elements and whether the interaction between each network element from the first set of two or more network elements interacts and other network elements from the first set of two or more network elements is enabled or disabled.

4. The method as recited in claim 1, wherein:
the first set of two or more network elements are connected in series, and
determining the first real time availability value includes determining a product of the availabilities of the network elements in the first set of two or more network elements.

5. The method as recited in claim 1, wherein:
the first set of two or more network elements includes a particular network element providing a service to two or more other network elements in the first set of two or more network elements, and
the method further comprises
determining the first real time availability value includes determining an availability value for each of the two or more other network elements with respect to the particular network element as a product of the availability of each of the two or more other network elements and the availability of the particular network element, and
identifying minimum and maximum determined availability values for the first set of two or more network elements.

6. The method as recited in claim 1, wherein:
the first set of two or more network elements includes a particular network element providing two or more services to two or more other network elements in the first set of two or more network elements, and
the method further comprises
determining an availability value for each of the two or more other network elements with respect to the particular network element for each of the two or more services based upon a product of the availability of each of the two or more other network elements and the particular network element for each of the two or more services, and
identifying minimum and maximum determined availability values for the first set of two or more network elements.

7. The method as recited in claim 1, wherein:
the first set of two or more network elements includes two or more other network elements providing two or more services to a particular network element in the first set of two or more network elements, and
determining the first real time availability value includes determining a product of the availabilities of the two or more other network elements and the particular network element.

8. The method as recited in claim 1, wherein:
the first set of two or more network elements includes two or more other network elements that are each able to provide a service to a particular network element in the first set of two or more network elements, and
determining the first real time availability value includes:
determining a first value that represents a sum of the availabilities of the particular network element with respect to each of the two or more other network elements,
determining a second value that represents a sum of unique combinations of products of the availabilities of the particular network element with respect to each of the two or more other network elements,
determining a third value that represents a product of all the availabilities of the particular network element with respect to each of the two or more other network elements, and
adding the first value to the third value and subtracting the second value.

9. A non-transitory computer-readable volatile or non-volatile storage medium for determining a real time availability of a group of two or more network elements, the computer-readable medium storing instructions which, when processed by one or more processors, cause:
determining a first real time availability value based upon both an estimated real time availability value for each network element in a first set of two or more network elements in the group of two or more network elements and cooperation relationships between the network elements in the first set of two or more network elements; and
determining a second real time availability value based upon the first real time availability value, an estimated real time availability value for each network element in a second set of two or more network elements in the group of two or more network elements, wherein the second set of two or more network elements is different than the first set of two or more network elements, cooperation relationships between the network elements in the second set of two or more network elements and cooperation relationships between one or more network elements in the first set of two or more network elements and the second set of two or more network elements.

10. The non-transitory computer-readable volatile or non-volatile medium as recited in claim 9, further storing additional instructions which, when processed by the one or more processors, cause determining the cooperation relationships between the first set of two or more network elements based upon whether each network element from the first set of two or more network elements interacts with other network elements from the first set of two or more network elements.

11. The non-transitory computer-readable volatile or non-volatile medium as recited in claim 9, further storing additional instructions which, when processed by the one or more processors, cause determining the cooperation relationships between the first set of two or more network elements based upon physical connections between the first set of two or more network elements and whether the interaction between each network element from the first set of two or more network elements interacts and other network elements from the first set of two or more network elements is enabled or disabled.

12. The non-transitory computer-readable volatile or non-volatile medium as recited in claim 9, wherein:
the first set of two or more network elements are connected in series, and
determining the first real time availability value includes determining a product of the availabilities of the network elements in the first set of two or more network elements.

13. The non-transitory computer-readable volatile or non-volatile medium as recited in claim 10, wherein:

the first set of two or more network elements includes a particular network element providing a service to two or more other network elements in the first set of two or more network elements, and the computer-readable medium further stores additional instructions which, when processed by the one or more processors, cause determining the first real time availability value includes determining an availability value for each of the two or more other network elements with respect to the particular network element as a product of the availability of each of the two or more other network elements and the availability of the particular network element, and identifying minimum and maximum determined availability values for the first set of two or more network elements.

14. The non-transitory computer-readable volatile or nonvolatile medium as recited in claim 9, wherein:

the first set of two or more network elements includes a particular network element providing two or more services to two or more other network elements in the first set of two or more network elements, and the computer-readable medium further stores additional instructions which, when processed by the one or more processors, cause determining an availability value for each of the two or more other network elements with respect to the particular network element for each of the two or more services based upon a-product of the availability of each of the two or more other network elements and the particular network element for each of the two or more services, and identifying minimum and maximum determined availability values for the first set of two or more network elements.

15. The non-transitory computer-readable volatile or nonvolatile medium as recited in claim 10, wherein:

the first set of two or more network elements includes two or more other network elements providing two or more services to a particular network element in the first set of two or more network elements, and determining the first real time availability value includes determining a product of the availabilities of the two or more other network elements and the particular network element.

16. The non-transitory computer-readable volatile or nonvolatile medium as recited in claim 9, wherein:

the first set of two or more network elements includes two or more other network elements that are each able to provide a service to a particular network element in the first set of two or more network elements, and determining the first real time availability value includes:
determining a first value that represents a sum of the availabilities of the particular network element with respect to each of the two or more other network elements, determining a second value that represents a sum of unique combinations of products of the availabilities of the particular network element with respect to each of the two or more other network elements, determining a third value that represents a product of all the availabilities of the particular network element with respect to each of the two or more other network elements, and adding the first value to the third value and subtracting the second value.

17. An apparatus for determining a real time availability of a group of two or more network elements, the apparatus comprising a memory storing instructions which, when processed by one or more processors, cause:

determining a first real time availability value based upon both an estimated real time availability value for each network element in a first set of two or more network elements in the group of two or more network elements and cooperation relationships between the network elements in the first set of two or more network elements; and determining a second real time availability value based upon the first real time availability value, an estimated real time availability value for each network element in a second set of two or more network elements in the group of two or more network elements, wherein the second set of two or more network elements is different than the first set of two or more network elements, cooperation relationships between the network elements in the second set of two or more network elements and cooperation relationships between one or more network elements in the first set of two or more network elements and the second set of two or more network elements.

18. The apparatus as recited in claim 17, wherein the memory includes additional instructions which, when processed by the one or more processors, cause determining the cooperation relationships between the first set of two or more network elements based upon whether each network element from the first set of two or more network elements interacts with other network elements from the first set of two or more network elements.

19. The apparatus as recited in claim 17, wherein the memory includes additional instructions which, when processed by the one or more processors, cause determining the cooperation relationships between the first set of two or more network elements based upon physical connections between the first set of two or more network elements and whether the interaction between each network element from the first set of two or more network elements interacts and other network elements from the first set of two or more network elements is enabled or disabled.

20. The apparatus as recited in claim 17, wherein:
the first set of two or more network elements are connected in series, and determining the first real time availability value includes determining a product of the availabilities of the network elements in the first set of two or more network elements.

21. The apparatus as recited in claim 17, wherein:
the first set of two or more network elements includes a particular network element providing a service to two or more other network elements in the first set of two or more network elements, and the memory includes additional instructions which, when processed by the one or more processors, cause determining the first real time availability value includes determining an availability value for each of the two or more other network elements with respect to the particular network element as a product of the availability of each of the two or more other network elements and the availability of the particular network element, and identifying minimum and maximum determined availability values for the first set of two or more network elements.

22. The apparatus as recited in claim 17, wherein:
the first set of two or more network elements includes a particular network element providing two or more services to two or more other network elements in the first set of two or more network elements, and the memory includes additional instructions which, when processed by the one or more processors, cause determining an availability value for each of the two or more other network elements with respect to the particular network element for each of the two or more services based upon a product of the availability of each of the two or more other network elements and the particular network element for each of the two or more services, and identifying minimum and maximum determined availability values for the first set of two or more network elements.

23. The apparatus as recited in claim 17, wherein:
the first set of two or more network elements includes two or more other network elements providing two or more services to a particular network element in the first set of two or more network elements, and
determining the first real time availability value includes determining a product of the availabilities of the two or more other network elements and the particular network element.

24. The apparatus as recited in claim 17, wherein:
the first set of two or more network elements includes two or more other network elements that are each able to provide a service to a particular network element in the first set of two or more network elements, and
determining the first real time availability value includes:
determining a first value that represents a sum of the availabilities of the particular network element with respect to each of the two or more other network elements,
determining a second value that represents a sum of unique combinations of products of the availabilities of the particular network element with respect to each of the two or more other network elements, determining a third value that represents a product of all the availabilities of the particular network element with respect to each of the two or more other network elements, and
adding the first value to the third value and subtracting the second value.

25. An apparatus for determining a real time availability of a group of two or more network elements, the apparatus comprising:
means for determining a first real time availability value based upon both an estimated real time availability value for each network element in a first set of two or more network elements in the group of two or more network elements and cooperation relationships between the network elements in the first set of two or more network elements; and
means for determining a second real time availability value based upon the first real time availability value, an estimated real time availability value for each network element in a second set of two or more network elements in the group of two or more network elements, wherein the second set of two or more network elements is different than the first set of two or more network elements, cooperation relationships between the network elements in the second set of two or more network elements and cooperation relationships between one or more network elements in the first set of two or more network elements and the second set of two or more network elements.

26. The apparatus as recited in claim 25, further comprising means for determining the cooperation relationships between the first set of two or more network elements based upon whether each network element from the first set of two or more network elements interacts with other network elements from the first set of two or more network elements.

27. The apparatus as recited in claim 17, further comprising means for determining the cooperation relationships between the first set of two or more network elements based upon physical connections between the first set of two or more network elements and whether the interaction between each network element from the first set of two or more network elements interacts and other network elements from the first set of two or more network elements is enabled or disabled.

28. The apparatus as recited in claim 25, wherein:
the first set of two or more network elements are connected in series, and
the means for determining the first real time availability value includes means for determining a product of the availabilities of the network elements in the first set of two or more network elements.

29. The apparatus as recited in claim 25, wherein:
the first set of two or more network elements includes a particular network element providing a service to two or more other network elements in the first set of two or more network elements, and
the apparatus further comprises means for
determining the first real time availability value includes determining an availability value for each of the two or more other network elements with respect to the particular network element as a product of the availability of each of the two or more other network elements and the availability of the particular network element, and
identifying minimum and maximum determined availability values for the first set of two or more network elements.

30. The apparatus as recited in claim 25, wherein:
the first set of two or more network elements includes a particular network element providing two or more services to two or more other network elements in the first set of two or more network elements, and
the apparatus further comprises means for
determining an availability value for each of the two or more other network elements with respect to the particular network element for each of the two or more services based upon a product of the availability of each of the two or more other network elements and the particular network element for each of the two or more services, and
identifying minimum and maximum determined availability values for the first set of two or more network elements.

31. The apparatus as recited in claim 25, wherein:
the first set of two or more network elements includes two or more other network elements providing two or more services to a particular network element in the first set of two or more network elements, and
the means for determining the first real time availability value includes means for determining a product of the availabilities of the two or more other network elements and the particular network element.

32. The apparatus as recited in claim 25, wherein:
the first set of two or more network elements includes two or more other network elements that are each able to provide a service to a particular network element in the first set of two or more network elements, and
the means for determining the first real time availability value includes means for:

determining a first value that represents a sum of the availabilities of the particular network element with respect to each of the two or more other network elements, determining a second value that represents a sum of unique combinations of products of the availabilities of the particular network element with respect to each of the two or more other network elements, determining a third value that represents a product of all the availabilities of the particular network element with respect to each of the two or more other network elements, and adding the first value to the third value and subtracting the second value.

\* \* \* \* \*

UNITED STATES PATENT AND TRADEMARK OFFICE
CERTIFICATE OF CORRECTION

| | | |
|---|---|---|
| PATENT NO. | : 7,974,216 B2 | Page 1 of 1 |
| APPLICATION NO. | : 10/995453 | |
| DATED | : July 5, 2011 | |
| INVENTOR(S) | : Cosmin Nicu Dini et al. | |

It is certified that error appears in the above-identified patent and that said Letters Patent is hereby corrected as shown below:

In the claims:

Claim 10, Column 12, line 40, insert -- storage -- between non-volatile and medium
Claim 11, Column 12, line 48, insert -- storage -- between non-volatile and medium
Claim 12, Column 12, line 59, insert -- storage -- between non-volatile and medium
Claim 13, Column 12, line 66, insert -- storage -- between non-volatile and medium
Claim 14, Column 13, line 18, insert -- storage -- between non-volatile and medium
Claim 15, Column 13, line 26, insert -- storage -- between non-volatile and medium
Claim 16, Column 13, line 36, insert -- storage -- between non-volatile and medium Signed and Sealed this
Fourth Day of October, 2011

David J. Kappos
*Director of the United States Patent and Trademark Office*